(12) United States Patent
Coppock et al.

(10) Patent No.: US 8,772,366 B2
(45) Date of Patent: *Jul. 8, 2014

(54) PHENOLIC FOAM (75) Inventors: Vincent Coppock, Chesire (GB); Ruud Zeggelaar, JK Arnhem (NL); Hiroo Takahashi, Funabashi (JP); Toshiyuki Kato, Fujimino (JP)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,889

(22) Filed: Sep. 5, 2012

(65) Prior Publication Data
US 2013/0072590 A1 Mar. 21, 2013

Related U.S. Application Data (63) Continuation of application No. 11/991,533, filed as application No. PCT/IE2006/000096 on Sep. 8, 2006, now abandoned, which is a continuation of application No. PCT/IE2005/000093, filed on Sep. 8, 2005.

(51) Int. Cl.
*C08J 9/00* (2006.01)
*C08J 9/14* (2006.01)
*C08G 8/00* (2006.01)
*C08G 8/04* (2006.01)
*C08G 8/10* (2006.01)

(52) U.S. Cl.
CPC *C08J 9/149* (2013.01); *C08J 9/145* (2013.01); *C08J 2361/10* (2013.01)
USPC ............. 521/181; 521/180; 521/136; 521/92; 521/97

(58) Field of Classification Search
USPC .................................... 521/180, 181, 136, 97
See application file for complete search history.

(56) References Cited

U.S. PATENT DOCUMENTS

| 2,744,875 A | 5/1956 | Thomas |
| 4,207,400 A | 6/1980 | Dahms |

(Continued)

FOREIGN PATENT DOCUMENTS

| EP | 0 377 230 | 7/1990 |
| EP | 0 579 321 | 1/1994 |

(Continued)

OTHER PUBLICATIONS

"Solubility Product Constants," Eni Generalic, 2003.

*Primary Examiner* — Kara Boyle
(74) *Attorney, Agent, or Firm* — Jacobson Holman, PLLC.

(57) ABSTRACT

A phenolic foam is made by foaming and curing a foamable phenolic resin composition that comprises a phenolic resin, a blowing agent, an acid catalyst and an inorganic filler. The blowing agent comprises a blend of chlorinated aliphatic hydrocarbon containing 2 to 5 carbon atoms and an aliphatic hydrocarbon containing from 3 to 6 carbon atoms mixed in a ratio of 60/40 to 5/5 parts by weight. The inorganic filler is at least one selected from a metal hydroxide, a metal oxide, a metal carbonate and a metal powder. The phenolic foam has a pH of 5 or more and a water uptake less than 1 kg/m$^2$. A phenolic foam with a higher pH value compared with conventional phenolic foam reduces corrosion risk when in contact with metallic materials. The phenolic foam maintains excellent long-term stable thermal insulation performance, low water uptake and fire resistance performance and by using the said blowing agent, does not harm the environment as an ozone or global warming depleting material.

34 Claims, 1 Drawing Sheet

Electron micrograph at 650 times magnification showing a calcium carbonate crystal dispersed in phenolic foam.

(56) References Cited

U.S. PATENT DOCUMENTS

| | | | |
|---|---|---|---|
| 4,418,158 A | * 11/1983 | Frentzel | ............ 521/115 |
| 4,525,492 A | * 6/1985 | Rastall et al. | ............ 521/181 |
| 4,898,893 A | 2/1990 | Ashida | |
| 5,137,931 A | 8/1992 | Okumura | |
| 5,616,626 A | 4/1997 | Rader | |
| 2006/0254164 A1 | 11/2006 | Ueda | |

FOREIGN PATENT DOCUMENTS

| | | | | |
|---|---|---|---|---|
| GB | 2 024 226 | 1/1980 | | |
| GB | 2 024 227 | 1/1980 | | |
| GB | 2024227 A | * 1/1980 | ............ | C08J 9/04 |
| WO | 2004/104350 | 12/2004 | | |
| WO | 2006/114777 | 11/2006 | | |
| WO | WO 2006114776 A1 | * 11/2006 | ............ | C08J 9/16 |

* cited by examiner

Electron micrograph at 650 times magnification showing a calcium carbonate crystal dispersed in phenolic foam.

PHENOLIC FOAM

This application is a Continuation Application of U.S. patent application Ser. No. 11/991,533, filed Dec. 22, 2009, which is a national stage application of PCT/IE2006/00096 filed Sep. 8, 2006, which claims priority to PCT application PCT/IE2005/000093 filed Sep. 8, 2005, which is incorporated by reference herein.

INTRODUCTION

Phenolic foam is used in insulation applications for construction materials because of its superior thermal insulation and fire resistance characteristics.

It is known that the thermal conductivity of polymeric thermal insulation materials including phenolic foam can change with time. This phenomenon is caused by the gradual diffusion out of gas from inside the foam cells. The gas present inside the foam cells is the blowing agent used in the foaming process. The gas in the foam cells is slowly replaced by air from the atmosphere. As a result, the thermal conductivity of phenolic foam can increase with time.

It is highly desirable to achieve long-term stability for the thermal insulation performance of phenolic foam products. It is believed that one of the causes for the degradation of thermal insulation performance is the reduction in the flexibility of the cell walls of phenolic foam with time. Therefore, an object of the present invention is to impart flexibility to the cell walls and thereby maintain closed cell structure in the phenolic foam. Stable closed cell structure provides a means for maintaining stable thermal conductivity for the phenolic foam over an extended time period.

As phenolic foam contains an acid catalyst, upon exposure to water such as rain, the acid catalyst may be extracted from the phenolic foam by such water. This could cause a problem when metallic materials are in contact with the phenolic foam, as metals could be susceptible to corrosion.

Under the above stated circumstances, the object of the present invention is to provide phenolic foam that has excellent thermal insulation performance, yet also have a higher pH value when compared to conventional phenolic foam. Such a phenolic foam when in contact with metal would have significantly reduced potential to induce metallic corrosion.

It is a further objective to use a blowing agent that causes minimal or no harm to the environment.

STATEMENTS OF INVENTION

According to the invention there is provided a phenolic foam made by foaming and curing a foamable phenolic resin composition that comprises a phenolic resin, a blowing agent, an acid catalyst and an inorganic filler characterised in that the blowing agent comprises a blend of a chlorinated aliphatic hydrocarbon containing 2 to 5 carbon atoms and an aliphatic hydrocarbon containing from 3 to 6 carbon atoms, in that the inorganic filler is at least one selected from a metal hydroxide and a metal carbonate, and in that the phenolic foam has a pH of 5 or more.

In one embodiment a phenolic foam as claimed in claim 1 wherein the phenolic resin has a molar ratio of phenol groups to aldehyde groups in the range 1:1 to 1:3, preferably the molar ratio of phenol groups to aldehyde groups is from 1.5 to 2.3.

In one embodiment the phenolic resin has a weight average molecular weight of from 400 to 3,000, preferably from 700 to 2,000.

In one embodiment the blowing agent comprises 1 to 20 parts by weight per 100 parts by weight of phenolic resin.

In one embodiment the chlorinated aliphatic hydrocarbon is selected from chloropropane and its isomers. Preferably the chlorinated aliphatic hydrocarbon is isopropyl chloride.

In one embodiment the blowing agent comprises isopropyl chloride and at least one hydrocarbon selected from butane, pentane, hexane, heptane and their isomers. The blowing agent may comprise 60% or more but less than 95% of isopropyl chloride. The blowing agent may comprise 40% or less of the aliphatic hydrocarbon. In one case the hydrocarbon is iso-pentane and is present as 15% by weight of the blowing agent.

In one embodiment the blowing agent blend comprises isopropyl chloride and iso-pentane in a weight ratio of from 60:40 to 95:05. Preferably, the blowing agent blend comprises isopropyl chloride and iso-pentane in a weight ratio of from 65:35 to 90:10. The blowing agent blend may comprise isopropyl chloride and iso-pentane in a weight ratio of from 70:30 to 85:15.

In one embodiment the acid catalyst comprises 5 to 25 parts by weight per 100 parts by weight of phenolic resin. The acid catalyst may comprise at least one of benzenesulphonic acid, para-toluene sulphonic acid, xylene sulphonic, naphthalene sulphonic acid, ethylbenzene sulphonic acid and phenol sulphonic acid.

In one embodiment the inorganic filler is present in an amount of from 1 to 20 parts by weight per 100 parts by weight of phenolic resin.

In one embodiment the filler comprises at least one of a metal oxide such as aluminium oxide or zinc oxide, a metal powder such as zinc, or a metal hydroxide such as aluminium hydroxide, magnesium hydroxide, or a metal carbonate such as calcium carbonate, magnesium carbonate, barium carbonate, zinc carbonate.

Preferably the filler may comprise at least one of a metal hydroxide such as aluminium hydroxide, magnesium hydroxide, or a metal carbonate such as calcium carbonate, magnesium carbonate, barium carbonate, zinc carbonate, preferably with a Ksp lower than $10^{-8}$ when measured at 25° C. Most preferably the filler comprises a metal carbonate such as calcium carbonate, barium carbonate, zinc carbonate.

High quality foam has been produced using calcium carbonate as the sole filler.

In one embodiment the foam comprises a plasticiser for the phenolic resin. The plasticiser may comprise 0.1 to 20 parts by weight per 100 parts by weight of phenolic resin. The plasticiser may comprise a polyester polyol that is the reaction product of a polybasic carboxylic acid selected from a dibasic to a tetra basic carboxylic acid with a polyhydric alcohol selected from a dihydric to a pentahydric alcohol. Preferably, the polyester polyol has a number average molecular weight of 250 to 350 and a weight average molecular weight of 400 to 550.

The polybasic carboxylic acid used to synthesise the polyester polyol may comprise at least one of phthalic acid, isophthalic acid, terephthalic acid, naphthalene-2,3-dicarboxylic acid, naphthalene-1,4-dicarboxylic acid, napththalene-2,6-dicarboxylic acid, adipic acid, pimeric acid, suberic acid, azelaic acid, sebacic acid, cyclohexane-1,2-dicarboxylic acid, cyclohexane-1,3-dicarboxylic acid, and cyclohexane-1,4-dicarboxylic acid. Preferably the polybasic carboxylic acid used to synthesise the polyester polyol comprises one or more of phthalic acid, isophthalic acid, or terephthalic acid.

The polyhydric alcohol used to synthesise the polyester polyol may comprise at least one of ethylene glycol, diethylene glycol, propylene glycol, dipropylene glycol, 1,4-butane diol, 1,5-pentane diol, 1,6-hexane diol, neopentyl glycol, 1,2-cyclohexane dimethanol, 1,3-cyclohexane dimethanol, and 1,4-cyclohexane dimethanol. Preferably the polyhydric alcohol used to synthesise the polyester polyol comprises one or more of diethylene glycol, propylene glycol, dipropylene glycol, 1,4-butane diol.

In one embodiment the phenolic foam comprises a surfactant for the phenolic resin. The surfactant may comprise 1 to 6 parts by weight per 100 parts by weight of phenolic resin.

In one embodiment the surfactant is a castor oil-ethylene oxide adduct wherein more than 20 moles but less than 40 moles of ethylene oxide are added per 1 mole of castor oil.

In one embodiment a phenolic foam comprises an organic modifier for co-reacting with the phenolic resin. The modifier may comprise 1 to 10 parts by weight of a compound having an amino group per 100 parts by weight of phenolic resin. In one case at least one amino group containing compound is selected from urea, dicyandiamide and melamine. Preferably, the modifier comprises approximately 5 parts by weight of urea. per 100 parts by weight of phenolic resin The phenolic foam has an aged thermal conductivity of 0.025 W/m·K or less when measured at a mean temperature of 10° C. after heat ageing for 175±5 days at 70±2° C., in accordance with the procedure as specified in European Standard EN13166:2001, Annex C, section C.4.2.3.

The phenolic foam may have a density of from 10 to 100 kg/m$^3$, preferably 10 to 45 kg/m$^3$.

The phenolic foam may have a closed cell content of 90% or more, preferably 92.5% or more. Preferably the foam has a limiting oxygen index of 30% or more.

Preferably, the phenolic foam has a water uptake of less than 0.9 kg/m$^2$, most preferably a water uptake of less than 0.8 kg/m$^2$.

In one embodiment the phenolic foam has a facing on at least one surface thereof.

The facing may comprise at least one of glass fibre-non woven fabric, spun bonded-non woven fabric, aluminium foil, bonded-non woven fabric, metal sheet, metal foil, ply wood, calcium silicate-board, plaster board, Kraft or other paper product, and wooden board.

BRIEF DESCRIPTION OF THE DRAWING

The invention will be more clearly understood from the following description. This is given by way of example only with reference to the accompanying FIGURE in which.

DETAILED DESCRIPTION

The phenolic foam comprises phenolic resin, a blend of chlorinated aliphatic hydrocarbon containing 2 to 5 carbon atoms and a low boiling point hydrocarbon blowing agent, an acid catalyst and an inorganic filler to regulate foam pH. The invention provides phenolic foam with a higher pH value than is currently typical of commercially available phenolic foam products. The higher pH helps prevent metallic materials from corroding when they are in prolonged contact with phenolic foam.

A preferred type of phenolic resin to use in the present invention is a resole resin. This resole resin can be obtained from the chemical reaction of phenol or a phenol based compound such as cresol, xylenol, para-alkylphenol, para-phenylphenol, resorcinol, and the like with an aldehyde such as formaldehyde, furfural, acetaldehyde and the like under a catalytic amount of alkali such as sodium hydroxide, potassium hydroxide, calcium hydroxide, or an aliphatic amine like trimethylamine, or triethylamine. These types of chemical constituent are commonly used in standard resole resin production, but the invention is not limited to just those chemicals listed here.

The molar ratio of phenol groups to aldehyde groups is not especially limited. It is preferred that the molar ratio of phenol to aldehyde is in the range from 1:1 to 1:3, more preferably from 1:1.5 to 1:2.5, and particularly preferable is 1:1.6 to 1:2.1.

A preferred weight average molecular weight suitable for the phenolic resin used in the invention is from 400 to 3,000, and more preferably from 700 to 2,000. The number average molecular weight is preferably from 150 to 1,000, and more preferably from 300 to 700.

A blend of a straight chain or branched chain chlorinated aliphatic hydrocarbon containing 2 to 5 carbon atoms, and a straight chain or branched aliphatic hydrocarbon containing 3 to 6 carbon atoms is used as the blowing agent in the present invention. The number of chlorine atoms is not especially limited but a preferred number is 1 to 4. For example, dichloroethane, propyl chloride, isopropyl chloride, butyl chloride, isobutyl chloride, pentyl chloride, isopentyl chloride and so on. A chlorinated aliphatic hydrocarbon may be selected individually or in combination with one or more other chlorinated aliphatic hydrocarbons. A chloropropane such as propyl chloride and isopropyl chloride is suitable and isopropyl chloride is more preferable.

The aliphatic hydrocarbon containing 3 to 6 carbon atoms used in combination with the chlorinated aliphatic hydrocarbon includes butane, pentane, hexane, heptane and the like. Isobutane and isopentane are particularly preferable.

The blowing agent used in the present invention comprises the chlorinated aliphatic hydrocarbon having 2 to 5 carbon atoms and the aliphatic hydrocarbon having 3 to 6 carbon atoms. A gas such as air, nitrogen, helium, argon, and carbon dioxide, and a fluorocarbon may be added to the foamable phenolic resin composition in such an amount that does not impair characteristics or physical properties of the phenolic foam of the present invention. A preferred amount of the substance to be added is 0.1 to 10% by weight, and more preferred is 0.5 to 1.5% by weight of blowing agent used.

The relative weight proportions of chlorinated aliphatic hydrocarbon containing 2 to 5 carbon atoms to the aliphatic hydrocarbon having 3 to 6 carbon atoms can vary on a weight basis from 60% to 95% of chlorinated aliphatic hydrocarbon containing 2 to 5 carbon atoms mixed with 40% to 5% of low boiling point hydrocarbon respectively.

The amount of the blowing agent used in the present invention is from 1 to 20 parts by weight relative to 100 parts by weight of phenolic resin, more preferably from 7 to 14 parts by weight per 100 parts by weight of phenolic resin.

Isopropyl Chloride (2-chloropropane) can be selected for its favourable environmental characteristics. Isopropyl Chloride (2-chloropropane) has been reported as having no global warming potential or ozone depletion characteristics. (Reference is United States Environmental Protection Agency, 40 CFR Part 82. FLR-6718-2 Protection of Stratospheric Ozone. Section II Listing of Acceptable Substitutes, B Foam Blowing 1b, 2-Chloropropane.

Hydrocarbons such as iso-pentane or isobutane also have low potential for global warming and do not deplete the ozone layer of the Earth.

It has been found that a blend of chlorinated aliphatic hydrocarbon containing 2 to 5 carbon atoms, such as isopropyl chloride, and low boiling hydrocarbon can be used as a blowing agent for phenolic foam. The foams produced are essentially free of cellular defects, and give stable low thermal conductivity values. Such foams are used as insulation products for buildings and transport.

The addition of inorganic filler to the phenolic foam of the present invention reduces residual acidity, and can improve fire performance whilst still maintaining low thermal conductivity.

The amount of inorganic filler used is preferably from 0.1 to 30 parts by weight, and more preferably, from 1 to 10 parts by weight relative to 100 parts by weight of phenolic resin. In one embodiment the filler comprises at least one of a metal oxide such as aluminium oxide or zinc oxide, a metal powder such as zinc, or a metal hydroxide such as aluminium hydroxide, magnesium hydroxide, or a metal carbonate such as calcium carbonate, magnesium carbonate, barium carbonate, zinc carbonate. Preferably the filler may comprise at least one of a metal hydroxide such as aluminium hydroxide, magnesium hydroxide, or a metal carbonate such as calcium carbonate, magnesium carbonate, barium carbonate, zinc carbonate, preferably with a Ksp lower than $10^{-8}$ when measured at 25° C.

The use of an organic amino group containing compound, such as urea, in the foam of the present invention, can lower thermal conductivity, increase strength and reduce friability of the phenolic foam. A preferred amount of urea to be used in the present invention is in the range from 1 to 10 parts by weight, preferably, from 3 to 7 parts by weight relative to 100 parts by weight of the phenolic resin.

For the acid catalyst used to initiate polymerisation of the phenolic resin in the invention, individual or blends of strong organic acids such as benzene sulphonic acid, para toluene sulphonic acid, xylene sulphonic acid, ethylbenzene sulphonic acid, naphthalene sulphonic acid, phenol sulphonic acid and the like are used. Phenol sulphonic acid, para toluene sulphonic acid, and xylene sulphonic acid are particularly preferred. An inorganic acid such as sulphuric acid, phosphoric acid and the like, may be optionally used with the said organic acids.

The amount of acid used to initiate polymerisation of the phenolic resin varies with the type of acid selected, but is usually in a range from 5 to 25 parts by weight, and more preferably from 7 to 22 parts by weight relative to 100 parts by weight of phenolic resin. The most preferable amount of acid to use is from 10 to 20 parts by weight of phenolic resin.

The phenolic resin used herein contains a surfactant to aid foam manufacture. The surfactant used is a castor oil-ethylene oxide adduct wherein more than 20 moles but less than 40 moles of ethylene oxide are added per mole of castor oil. The weight addition of the castor oil-EO adduct relative to 100 parts by weight of phenolic resin is preferably from 1 to 5 parts by weight, and more preferably from 2 to 4 parts by weight. If the content of the castor oil-EO adduct is less than 1 part by weight, uniform foam cells cannot be obtained. On the other hand, if more than 5 parts by weight of the castor oil-EO adduct is used, product cost and the water-absorption capacity of the foam is increased.

In accordance with the present invention, there is provided a plasticiser for the phenolic foam. A polyester polyol is the preferred plasticiser.

The plasticiser imparts flexibility to the cell walls of the phenolic foam, inhibits their degradation over time, and improves long term thermal insulation stability. The plasticiser of the present invention is a polyester polyol that is obtained from the reaction of a polybasic carboxylic acid with a polyhydric alcohol. In terms of imparting flexibility to the cell-walls of phenolic foam, the molecular weight of the plasticiser is not especially limited. However, a polyester polyol having a weight average molecular weight from 200 to 10,000, and particularly from 200 to 5,000, is preferred.

The polyhydric alcohol used preferably has at least two hydroxyl groups in a molecule. The number of hydroxyl groups in a molecule of the polyhydric alcohol used is at least more than 1.

The number of carboxyl groups in a molecule of the said polybasic carboxylic acid is at least more than 1.

The polyester polyol of the present invention is for example, the reaction product of a polybasic carboxylic acid selected from a dibasic to a tetrabasic carboxylic acid with a polyhydric alcohol selected from a dihydric to a pentahydric alcohol. A product expressed in the Formula (I) below is preferable, wherein A is a dicarboxylic acid residue originally containing up to two hydrogen atoms from a dibasic carboxylic acid, and R is a chemical backbone of a dihydric alcohol originally containing up to two hydroxyl groups from a dihydric alcohol, and n is an integer equal to or more than 1.

In the general formula (I), a preferred dibasic carboxylic acid forming the residue A is either an aromatic dicarboxylic acid, an aliphatic dicarboxylic acid or an alicyclic dicarboxylic acid. These carboxylic acids preferably include phthalic acid, isophthalic acid, terephthalic acid, naphthalene-2,3-dicarboxylic acid, naphthalene-1,4-dicarboxylic acid, naphthalene-2,6-dicarboxylic acid, adipic acid, pimeric acid, suberic acid, azelaic acid, sebacic acid, cyclohexane-1,2-dicarboxylic acid, cyclohexane-1,3-dicarboxylic acid, cyclohexane-1,4-dicarboxylic acid and the like.

The dihydric alcohol forming chemical backbone R is an aromatic glycol, an aliphatic glycol or an alicyclic glycol which preferably includes ethylene glycol, diethylene glycol, propylene glycol, dipropylene glycol, 1,4-butane diol, 1,5-pentane diol, 1,6-hexane diol, neopentyl glycol, 1,2-cyclohexane dimethanol, 1,3-cyclohexane dimethanol, and 1,4-cyclohexane dimethanol, cyclopentane-1,2-diol, cyclepentane-1,2-dimethanol, cyclohexane-1,2-diol, cyclohexane-1,3-diol, cyclohexane-1,4-diol, cyclopentane-1,4-dimethano-1,2,5-norbornane diol and the like. Aliphatic glycols and alicyclic glycols are especially preferable.

A reaction product so obtained is a mixture in which "n" is composed of various values and the hydroxyl value of these reaction products is usually included in a range of from 10 to 500 mg-KOH/g.

Since the plasticiser for the phenolic foam in the present invention has a molecular structure containing both an ester backbone and a hydroxyl group, it is hydrophilic as is the phenolic resin. Therefore the phenolic resin and the plasticiser are compatible and together can form a homogeneous resin solution. Furthermore, it is presumed that when the said polyester polyol, is added to a foamable phenolic resin composition, the polyester polyol imparts flexibility to the cell-walls of the phenolic foam. Therefore, even after extensive ageing, degradation phenomenon such as a crack-occurrence at the cell-walls is controlled. This leads to long-term stability for the thermal conductivity of the phenolic foam.

Also the combination of the plasticizer and organic filler results in an improved water uptake. Moisture is one of the thriving forces of corrosion. Therefore the water uptake of the product should be limited below 1 kg/m$^2$.

The phenolic foam of the present invention has an aged thermal conductivity below 0.025 W/m·K (at a mean temperature of 10° C.). Phenolic foam that has an aged thermal conductivity more than 0.025 W/m·K is less efficient in terms of thermal insulation performance.

The surface of the phenolic foam products of the present invention may be covered with a facing material. Surface facing materials include non-woven fabrics made of natural fibre, synthetic fibre or inorganic fibre. Paper or Kraft paper, aluminium foil and so on can be used as facing material.

A process for producing phenolic foam of the invention with a pH above 5.0 is described that uses a phenolic resin composition that contains phenolic resin, an acid catalyst, a blend of chlorinated aliphatic hydrocarbon containing 2 to 5 carbon atoms and an aliphatic hydrocarbon as blowing agent, and an inorganic filler to raise the pH of the foam. The phenolic resin used could also contain plasticiser, surfactant, and a chemical compound having amino groups. The said blowing agent mixture, and acid catalyst are generally added to the phenolic resin composition in a foam mixing head at the time of foam manufacture.

As stated, to the resin composition used in producing phenolic foam of the present invention, is added an amino group containing compound. This is preferably urea powder that is mixed into the phenolic resin at 18° C. to 22° C. for 1 to 5 hours prior to making foam. Alternatively an amino group containing compound like urea can be reacted with formaldehyde in the presence of phenol during the manufacture of the phenolic resin.

Castor oil-EO adduct surfactant, an inorganic filler such as calcium carbonate powder with mean particle size 50 to 200 μm, and preferably, a polyester polyol plasticiser are also mixed into the phenolic resin.

The phenolic resin composition obtained is pumped to a high speed mixer head where it is introduced to and mixed in with the blend of chlorinated aliphatic hydrocarbon containing 2 to 5 carbon atoms and low boiling point hydrocarbon blowing agent and an acid catalyst to prepare a foamable phenolic composition.

According to the process for producing phenolic foam of the present invention, the said foamable phenolic resin composition is discharged on to a continuous running facing material carrier and passed through a heated zone for foaming and moulding into phenolic foam products of predetermined shape. In this manufacturing process, the said resin composition that has been discharged on to a running facing material carrier on a conveyor belt passes into a heated oven typically at 50 to 100° C. for approximately 2 to 15 minutes. The top surface of the rising foam composition is pressed down with another facing material carried on an upper conveyer belt. The thickness of the foam is controlled to the required predetermined thickness. The phenolic foam leaving the oven is then cut to a predetermined length.

The use of an appropriate blend of isopropyl chloride and iso-pentane as the blowing agent for example, is environmentally friendly but still allows closed cell phenolic foam to be produced, thereby maintaining thermal insulation performance. The phenolic foam in the present invention comprises foaming and curing a foamable phenolic resin composition comprising a phenolic resin, an acid catalyst, a blend of chlorinated aliphatic hydrocarbon containing 2 to 5 carbon atoms and low boiling point aliphatic hydrocarbon as blowing agent, and an inorganic filler.

In accordance with the present invention, corrosion-resistant phenolic foam is provided by using a blend of chlorinated aliphatic hydrocarbon containing 2 to 5 carbon atoms and aliphatic hydrocarbon blowing agent, and additionally controlling the amount of acid catalyst and adding an inorganic filler such as calcium carbonate to the foam. The phenolic foam produced has excellent fire resistance performance, long-term thermal insulation performance stability, low water uptake and a higher pH value than is normally obtained with phenolic foam products. Further the blowing agent used has favourable properties regarding global warming potential and ozone depletion.

The invention described herein overcomes the potential corrosion risk to metal in contact with phenolic foam by providing a means of partially neutralising the residual acid in the phenolic foam using an inorganic filler.

The higher pH foam, can prevent metal in contact with the phenolic foam from becoming corroded. The higher pH foam can prevent metal in contact with the phenolic foam from becoming corroded. The phenolic foam of the present invention has a pH of 5.0 or more. If the pH is 5.0 or more, the corrosion of metal can be inhibited when in contact with or adjacent to the said phenolic foam even when the metal is wet. A preferable pH for the phenolic foam of the invention is 5.5 or more and especially preferable is when pH is 6.0 or more. The method for the determination of pH is described later.

The phenolic foam of the present invention has an aged thermal conductivity of below 0.025 W/m·K. The thermal insulation performance of phenolic foam with an aged thermal conductivity above 0.025 W/m·K is undesirable regarding insulation performance.

The phenolic foam in the present invention has typically a density of 10 to 45 kg/m$^3$, and an average cell diameter of 5 to 400 μm.

The phenolic foam of the present invention has substantially no holes in the cell-walls.

The phenolic foam of the present invention has a closed cell content of 90% or more, preferably 92.5% or more.

The phenolic foam in the present invention has preferably an oxygen index of 30 or more.

The long-term stability of the phenolic foam cells is maintained because the phenolic foam cells of the present invention have improved flexibility.

Suitable testing methods for measuring the physical properties of phenolic foam are described below.

(1) Foam Density

This was measured according to EN 1602: Thermal insulating products for building applications—Determination of the apparent density (2) Thermal Conductivity A foam test piece of length 300 mm and width 300 mm was placed between a high temperature plate at 20° C. and a low temperature plate at 0° C. in a thermal conductivity test instrument (LaserComp Type FOX314/ASF, Inventech Benelux BV). The thermal conductivity (TC) of the test pieces was measured according to EN12667: Thermal performance of building materials and products—Determination of thermal resistance by means of guarded hot plate and heat flow meter methods, Products of high and medium thermal resistance.

(3) Thermal Conductivity after Accelerated Ageing

This was measured using EN 13166: Thermal insulation products for buildings—Factory made products of phenolic foam (PF)—Specification Annex C section.4.2.3. The thermal conductivity is measured after exposing foam samples for 25 weeks at 70° C. and stabilisation to constant weight at 23° C. and 50% R.H. This thermal ageing serves to provide an estimated thermal conductivity for a time period of 25 years at ambient temperature.

(4) pH 0.5 g of phenolic foam is pulverised to pass through a 250 μm (60 mesh) sieve and is then put into a 200 ml-Erlenmeyer flask. 200 ml of distilled water are added and the contents are sealed with a stopper. After stirring at 23±5 for 7 days with a magnetic follower, the contents of the flask are tested for pH.

(5) Average Cell Diameter

A flat section of foam is obtained by slicing through the middle section of the thickness of the foam board in a direction running parallel to the top and bottom faces of a foam board. A 50-fold enlarged photocopy is taken of the cut cross section of the foam. Four straight lines of length 9 cm are drawn on to the photocopy. The number of cells present on every line is counted and the average number cell number determined according to JIS K6402 test method. The average cell diameter is taken as 1800 μm divided by this average number.

(6) Voids

A flat section of foam is obtained by slicing through the middle section of the thickness of the foam board in a direction running parallel to the top and bottom faces. A 200-fold enlarged photocopy is taken of this cut cross section of foam covering an area 100 mm by 150 mm. A transparent graph paper is placed on top of the photocopy of the cut foam section. The area of voids that occupy 8 or more 1 mm by 1 mm squares of graph paper was added up to calculate the voids area ratio. Eight squares is equivalent to 2 $mm^2$ area of actual foam.

(7) Oxygen Index

The oxygen index at room temperature of phenol foam was determined according to JIS K7201-2 test method.

(8) Closed Cell Ratio

The closed cell ratio was determined according to ASTM D2856 test method.

(9) Water uptake

The water uptake was determined according to EN1609: 1996 Thermal Insulating products for building applications—Determination of short term water absorption by partial immersion.

(10) Friability

Friability is measured according test method ASTM C 421-88.

The present invention is explained in detail by the Examples and Comparative Example that follow. The physical properties of the phenolic foams obtained are shown in Table 1 below. However, the invention is not limited only to these Examples and Comparative Example.

EXAMPLES

The phenolic resins used in the invention are phenolic resole Resins A and B and are described as follows.

Phenolic resole Resin A is a commercially available liquid Phenol Formaldehyde resin supplied by Sumitomo Bakelite under the trade name R300. This resin has a viscosity of 8000-10000 centipoise (cP) at 25° C., weight average molecular weight 800 to 1200 and pH 5.3 to 6.3.

R330 resin contains from 2% to 4% free phenol and 3% to 4% free formaldehyde. R330 resin has a Phenol:Formaldehyde molar ratio of 1:2 and a water content of 11-13% (measured by Karl Fisher analysis). To this resin, between 2 and 5% surfactant as described previously herein, is added.

Phenolic resole Resin B is a liquid Phenol-Urea-Formaldehyde resin. This resin has a viscosity of 13000-18000 cp at 25° C., weight average molecular weight 500 to 700, and pH 5.3 to 6.3.

Resin B resin contains from 2% to 4% free phenol and 1% to 2% free formaldehyde. Resin B has a Phenol:Urea:Formaldehyde molar ratio of 1:0.25:2.0 and a water content of 11-13% (measured by Karl Fisher analysis). To this resin between 2 and 5% surfactant as described previously herein, is added.

The following Examples 1 and 5 show how foam samples of the invention are made.

Example 1

To 244 g of Resin A, at 11-15° C., is mixed with 12.2 g of powdered urea and 6.1 g of a plasticiser as described previously herein. The resin is allowed to stand for between 2 and 24 hours. Then, 12.2 g of calcium carbonate powder (Durcal 130 supplied by Omya) of average particle size 170 μm is added and mixed into the resin until it is uniformly dispersed. Next, 21.0 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 $kg/m^3$.

In Table 1, no facing materials such as aluminium foil were present on the surfaces of the foam board sample during thermal ageing.

Figure 1:
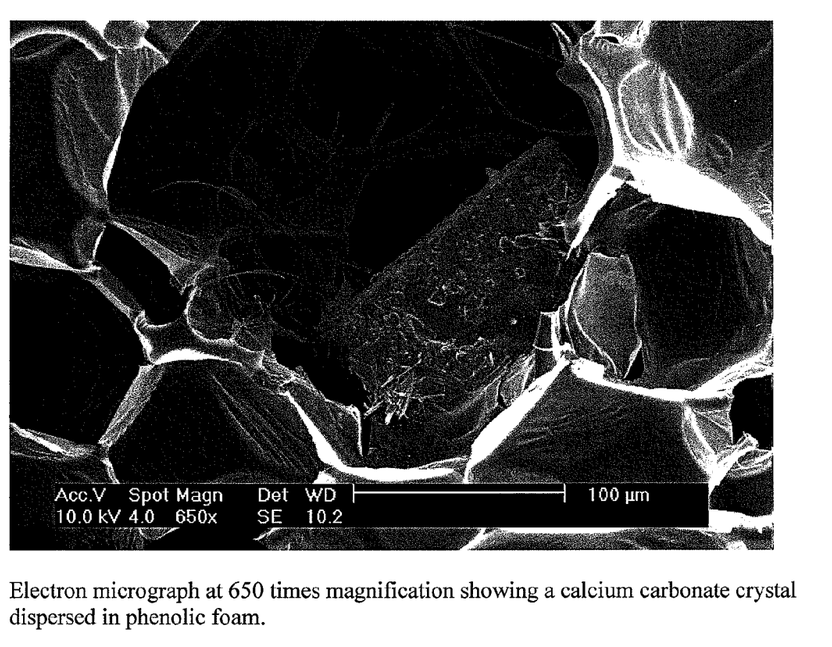
FIG. 1 shows an electron micrograph of a sample of the phenolic foam from Example 1 having a magnification of 650 times. Calcium carbonate filler is shown dispersed among the foam cells. To prepare the foam samples for electron microscopy analysis, foams are sputter coated with a 1.5 to 2.5 nm layer of gold in an evacuated inert atmosphere. This procedure acts as an aid to see cellular defects more clearly. Electron microscopy can be used to demonstrate whether foam cells have defects such as holes or cracks.

FIG. 1 shows an electron micrograph of a sample of the phenolic foam from Example 1 with a magnification of 650 times. Calcium carbonate filler is shown dispersed among the foam cells.

Example 2

Here the ratio of isopropyl chloride to iso-pentane is adjusted to 70/30 parts per weight).

To 244 g of Resin A, at 11-15° C., is mixed with 12.2 g of powdered urea and 6.1 g of plasticizer as described previously herein. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of pre-blended isopropyl chloride/iso-pentane (70/30 parts by weight) as blowing agent at 1° C. is mixed into the resin. Once a uniform emulsion has formed, the resin mixture is cooled to between 5° C. and 10° C. Next, 40 g of liquid para-toluene sulphonic acid/ xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Example 3

Here there is a higher addition of plasticiser to the resin (12.2 g instead of 6.1 g To 244 g of Resin A, at 11-15° C., is mixed with 12.2 g of powdered urea and 12.2 g of plasticiser as described previously herein. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Example 4

Here there is the addition of a lower amount of urea to the resin (6.1 g instead of 12.2 g).

To 244 g of Resin A, at 11-15° C., is mixed with 6.1 g of powdered urea and 6.1 g of plasticiser as described previously herein. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Example 5

To 244 g of Resin B, at 11-15° C., is mixed with 6.1 g of plasticiser as described previously herein and 12.2 g of calcium carbonate powder (Durcal 130 supplied by Omya) which is mixed until uniformly dispersed. Next, 21 g of pre-blended isopropyl chloride/iso-pentane blend (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Comparative Example 1

The following comparative example describes the manufacture of a foam without calcium carbonate filler.

To 244 g of Resin A, at 11-15° C., is mixed 12.2 g with powdered urea and 6.1 g of plasticiser as described previously herein. The resin is allowed to stand for between 2 and 24 hours. Next, 21 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Comparative Example 1 demonstrates that a good quality phenolic insulation foam can be produced without the filler present, but the resulting foam shows a pH<5.0 and a water uptake >1.0 kg/m$^2$ when tested to test methods (4) and (9) as given above (see Table 1 for results summary).

Comparative Example 2

The following comparative example describes the manufacture of a foam with magnesium carbonate as filler.

To 244 g of Resin A, at 11-15° C., is mixed with 12.2 g of powdered urea and 6.1 g of plasticiser as described previously herein. The resin is allowed to stand for between 2 and 24 hours. Then, 12.2 g of magnesium carbonate powder (supplied by Sigma-Aldrich product code M-7179) is added and mixed into the resin until it is uniformly dispersed. Next, 21 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately.

Mixing of the acid into resin takes less than 10 seconds and the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Comparative Example 2 demonstrates that use of a filler with a high solubility parameter (Ksp>1×10$^{-8}$) can produce a foam, but the resulting foam shows a water uptake >1.0 kg/m$^2$ when tested to test method (9), and poorer foam structure caused by reaction of the filler with the acid catalyst which results in higher thermal conductivity (see Table 1).

Comparative Example 3

The following comparative example describes the manufacture of a foam with isopropyl chloride only as a blowing agent.

To 244 g of Resin A, at 11-15° C., is mixed with 12.2 g of powdered urea and 6.1 g of plasticiser as described previously herein. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of isopropyl chloride as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m$^3$.

In Table 1, no facing materials such as aluminium foil were present on the surfaces of the foam board sample during thermal ageing.

Comparative Example 3 demonstrates that use of 100% isopropyl chloride as blowing agent gives a poorer foam structure which results in higher aged thermal conductivity performance (see Table 1), and larger cells with a high aspect ratio (typically >3:1). The high aspect ratio is undesirable for practical use of the foam as poor compressive strength is seen across the narrow cell dimension, which will result in shrinkage of the foam in situ.

Comparative Example 4

The following comparative example describes the manufacture of a foam with a ratio of isopropyl chloride to iso-pentane of 50/50 parts by weight.

To 244 g of Resin A, at 11-15° C., is mixed with 12.2 g of powdered urea and 6.1 g of plasticiser as described previously herein. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of pre-blended isopropyl chloride/iso-pentane (50/50 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had a apparent density of approximately 40.5 kg/m$^3$.

In Table 1, no facing materials such as aluminium foil were present on the surfaces of the foam board sample during thermal ageing.

Comparative Example 4 demonstrates that use of <60% isopropyl chloride and >40% iso-pentane as blowing agent gives an inferior foam structure which results in higher aged thermal conductivity values (see Table 1), caused by poorer integrity of the cell wall structure.

Comparative Example 5

The following comparative example describes the manufacture of a foam without the addition of a plasticiser.

To 244 g of Resin A, at 11-15° C., is mixed with 12.2 g of powdered urea. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had a apparent density of approximately 40.5 kg/m$^3$.

In Table 1, no facing materials such as aluminium foil were present on the surfaces of the foam board sample during thermal ageing.

Comparative Example 5 demonstrates that the absence of plasticiser results in a foam with poorer cell structure which results in higher aged thermal conductivity values (see Table 1).

Comparative Example 6

The following comparative example describes the manufacture of a foam without the addition of urea.

To 244 g of Resin A, at 11-15° C., is mixed with 12.2 g of powdered urea and 6.1 g of plasticiser as described previously herein. The resin is allowed to stand for between 2 and 24 hours. Then, 12.2 g of calcium carbonate powder (Durcal 130 supplied by Omya) is added and mixed into the resin until it is uniformly dispersed. Next, 21.0 g of pre-blended isopropyl chloride/iso-pentane (85/15 parts by weight) as blowing agent at 1° C. is mixed into the resin. Once a uniform emulsion has formed, the resin mixture is cooled to between 5° C. and 10° C. Next, 40 g of liquid para-toluene sulphonic acid/xylene sulphonic acid blend (65/35 parts by weight) at 92% concentration, at 8° C. is quickly mixed in. Foaming commences immediately. Mixing of the acid into resin takes less than 10 seconds and 200 g of the resin mix is quickly poured into a 30×30×5.0 cm picture frame mould preheated to 70-75° C.

A pressure of 40 to 50 kPa is applied to the lid of the mould to pressurise the rising foam. The foam is cured at 70-75° C. for 10 minutes. The foam sample is then post-cured in an oven for 2 to 12 hours at 70° C. The foam board produced had an apparent density of approximately 40.5 kg/m³.

Comparative Example 6 demonstrates that lack of urea results in a foam with poorer cell structure which results in higher aged thermal conductivity values (see Table 1).

Comparative Example 7

An attempt was made to prepare a foam using lithium carbonate as a filler. Only a low quality foam sample could be made due to reaction of the filler with the acid catalyst. The poor foam structure obtained was difficult to characterise accurately but was found to have high thermal conductivity and show a high water uptake.

Comparative example 7 demonstrates that use of a filler with a very high solubility parameter ($K_{sp} \gg 1 \times 10^4$), produces a foam which shows higher water uptake when evaluated by test method (9). The foam structure results in higher thermal conductivity.

In Table 1, no facing materials such as aluminium foil were present on the surfaces of the foam board sample during thermal ageing.

The pH value of Comparative Example 1 is well below 5.0. Comparative Example 2 results in a water uptake higher than 1 kg/m².

The use of pure isopropyl chloride (Comparative Example 3) as a blowing agent and the use of a mixture of 50 w % isopropyl chloride and 50 w % iso-pentane (Comparative Example 4), results in an aged thermal conductivity value higher than 0.025 W/m·K.

Comparative Examples 5 and 6 show respectively, the aged thermal conductivity value of a sample without plasticiser and urea.

TABLE 1

| | Density (kg/m³) | Thermal Conductivity (W/m·K at 10° C.) | Thermal Conductivity After 25 weeks at 70° C. + 5 weeks at 23° C. and 50% RH (W/m·K at 10° C.) | pH | Average Cell Diameter (μm) | Voids (%) | Oxygen Index (%) | Water uptake (kg/m²) | Friability (%) | Closed Cell Ratio (%) |
|---|---|---|---|---|---|---|---|---|---|---|
| Ex 1 | 40.0 | 0.01968 | 0.02055 | 6.1 | 95 | 0.8 | 33 | 0.65 | 38 | 94 |
| Ex 2 | 40.3 | 0.01948 | 0.02045 | 5.9 | 88 | 0.9 | 32 | 0.61 | 35 | 93 |
| Ex 3 | 40.6 | 0.01981 | 0.02072 | 6.0 | 92 | 0.7 | 32 | 0.68 | 39 | 93 |
| Ex 4 | 39.8 | 0.02021 | 0.02321 | 6.3 | 96 | 0.7 | 32 | 0.71 | 37 | 93 |
| Ex. 5 | 40.4 | 0.02006 | 0.02115 | 5.9 | 80 | 0.8 | 33 | 0.75 | 33 | 94 |
| C. Ex. 1 | 40.1 | 0.01958 | 0.02095 | 2.7 | 85 | 0.6 | 33 | 1.24 | 28 | 94 |
| C. Ex. 2 | 40.5 | 0.02060 | 0.02658 | 5.9 | 98 | 0.8 | 31 | 1.02 | 36 | 91 |
| C. Ex. 3 | 40.5 | 0.02009 | 0.02528 | 6.0 | 145 | 0.9 | 32 | 0.81 | 45 | 91 |
| C. Ex. 4 | 39.8 | 0.01878 | 0.02807 | 6.1 | 60 | 0.6 | 32 | 0.69 | 29 | 94 |
| C. Ex. 5 | 40.7 | 0.02005 | 0.02537 | 6.3 | 95 | 0.8 | 33 | 0.76 | 37 | 93 |
| C. Ex. 6 | 39.5 | 0.01980 | 0.02911 | 5.9 | 89 | 0.7 | 33 | 0.72 | 30 | 92 |

The foam sample where magnesium carbonate is used results in an acceptable pH value. The water uptake of the product with magnesium carbonate however is higher compared to the water uptake of the foam sample with calcium carbonate. The foam sample where lithium carbonate is used as a filler gave very poor foam quality with high water uptake. These inferior results could be caused by the higher solubility constant of the fillers which react with the acid catalyst and can adversely affect foam quality. For this reason, a filler with a solubility parameter below $1 \times 10^{-8}$ is preferred.

| Compound | Formula | $K_{SP}$ (at 25° C.) |
|---|---|---|
| lithium carbonate | Li₂CO₃ | $2.5 * 10^{-4}$ |
| magnesium carbonate | MgCO₃ | $3.8 * 10^{-8}$ |
| calcium carbonate (calcite) | CaCO₃ | $3.8 * 10^{-9}$ |
| barium carbonate | BaCO₃ | $5.1 * 10^{-9}$ |

Ionic compounds normally dissociate into their constituent ions when they dissolve in water. For example calcium carbonate:

$$CaCO_3(s) \rightleftarrows Ca^{2+}(aq) + CO_3^{2-}(aq)$$

The equilibrium expression is:

$$K_c = \frac{[Ca^{2+}(aq)][CO_3^{2-}(aq)]}{\{CaCO_3(s)\}}$$

Where Kc is called the equilibrium constant (or solubility constant, the square brackets mean molar concentration (M, or mol/L), and curly brackets mean activity. Since the activity of a pure solid is equal to one, this expression reduces to the solubility product expression:

$$K_{sp} = [Ca^{2+}(aq)][CO_3^{2-}(aq)]$$

This expression says that an aqueous solution in equilibrium with (saturated with) solid calcium carbonate has concentrations of these two ions such that their product equals Ksp; for calcium carbonate Ksp=$3.8 * 10^{-9}$ measured at 25° C.

The higher solubility of magnesium and lithium carbonate also contributes to additional pressure build-up during the foaming process which is undesirable.

The phenolic foam of the present invention comprises a blowing agent containing a blend of chlorinated aliphatic hydrocarbon containing 2 to 5 carbon atoms and an aliphatic hydrocarbon. The amount of acid catalyst that is used is controlled, and an inorganic filler such as calcium carbonate is added to increase pH. The higher pH value of the foam ensures that metallic material in contact with the phenolic foam is at reduced risk of corrosion.

The phenolic foam retains favourable fire-performance characteristics, and has stable thermal insulation performance over extended time scale.

The phenolic foam is used industrially as thermal insulation for construction materials.

The invention claimed is:

1. A composition for forming, when foamed and cured, a phenolic foam product with a pH of 5 or more, a closed cell content of 90% or more, and an aged thermal conductivity of 0.025 W/m·K or less when measured at a mean temperature of 10° C. after heat aging for 175±5 days at 70±2° C. in accordance with the procedure specified in European Standard EN13166: 2001, Annex C, Section C.4.2.3, the composition comprising:
   a phenolic resin,
   a blowing agent,
   an acid curing catalyst to initiate polymerization of the phenolic resin,
   an inorganic filler,
   a plasticiser and an organic modifier for co-reacting with the phenolic resin;
wherein
   the blowing agent comprises isopropyl chloride and at least one hydrocarbon of butane, pentane, hexane and their isomers in a weight ratio of from 60:40 to 95:5;
   the inorganic filler consists of a metal hydroxide or metal carbonate with an ionic equilibrium solubility (Ksp) less than $10^{-8}$ when measured at 25° C.; and
   the plasticiser has a molecular structure containing both an ester backbone and a hydroxyl group.

2. The composition as claimed in claim 1 wherein the filler consists of a metal carbonate selected from calcium carbonate, barium carbonate, or zinc carbonate.

3. The composition as claimed in claim 1 wherein the filler consists of calcium carbonate.

4. The composition as claimed in claim 1 wherein the phenolic resin comprises phenol groups and aldehyde groups in a molar ratio of phenol groups to aldehyde groups in the range 1:1 to 1:3.

5. The composition as claimed in claim 1 wherein the phenolic resin comprises phenol groups and aldehyde groups in a molar ratio of phenol groups to aldehyde groups in the range of from 1:1.5 to 1:2.5.

6. The composition as claimed in claim 1 wherein the phenolic resin has a weight average molecular weight of from 400 to 3,000.

7. The composition as claimed in claim 1 wherein the phenolic resin has a weight average molecular weight of from 700 to 2,000.

8. The composition as claimed in claim 1 wherein the blowing agent is present in an amount of 1 to 20 parts by weight per 100 parts by weight of phenolic resin.

9. The composition as claimed in claim 1 wherein the blowing agent comprises 75% or more is isopropyl chloride.

10. The composition as claimed in claim 1 wherein the hydrocarbon is iso-pentane and is present as 15% by weight of the blowing agent.

11. The composition as claimed in claim 1 wherein the blowing agent blend comprises isopropyl chloride and isopentane in a weight ratio of from 60:40 to 95:5.

12. The composition as claimed in claim 1 wherein the blowing agent blend comprises isopropyl chloride and isopentane in a weight ratio of from 65:35 to 90:10.

13. The composition as claimed in claim 1 wherein the blowing agent blend comprises isopropyl chloride and isopentane in a weight ratio of from 70:30 to 85:15.

14. The composition as claimed in claim 1 wherein the acid catalyst is present in an amount of 5 to 25 parts by weight per 100 parts by weight of phenolic resin.

15. The composition as claimed in claim 14 wherein the acid catalyst comprises at least one of benzenesulphonic acid, para-toluene sulphonic acid, xylene sulphonic, naphthalene sulphonic acid, ethylbenzene sulphonic acid and phenol sulphonic acid.

16. The composition as claimed in claim 1 wherein the inorganic filler is present in an amount of from 1 to 20 parts by weight per 100 parts by weight of phenolic resin.

17. The composition as claimed in claim 1 wherein the plasticiser is present in an amount of 0.1 to 20 parts by weight per 100 parts by weight of phenolic resin.

18. The composition as claimed in claim 1 wherein the plasticiser is present in an amount of 5 parts by weight per 100 parts by weight of phenolic resin, and the plasticiser comprises a polyester polyol that is the reaction product of a polybasic carboxylic acid selected from a dibasic to a tetra basic carboxylic acid with a polyhydric alcohol selected from a dihydric to a pentahydric alcohol.

19. The composition as claimed in claim 18 wherein the polyester polyol has a number average molecular weight of 250 to 350 and a weight average molecular weight of 400 to 550.

20. The composition as claimed in claim 18 wherein the polybasic carboxylic acid used to synthesise the polyester polyol comprises at least one of phthalic acid, isophthalic acid, terephthalic acid, naphthalene-2,3-dicarboxylic acid, naphthalene-1,4-dicarboxylic acid and naphthalene-2,6-dicarboxylic acid.

21. The composition as claimed in claim 18 wherein the polybasic carboxylic acid used to synthesise the polyester polyol comprises one or more of phthalic acid, isophthalic acid, or terephthalic acid.

22. The composition as claimed claim 18 wherein the polyhydric alcohol used to synthesis the polyester polyol comprises at least one of ethylene glycol, diethylene glycol, propylene glycol, dipropylene glycol, 1,4-butane diol, 1,5-pentane diol, 1,6-hexane diol and neopentyl glycol.

23. The composition as claimed in claim 22 wherein the polyhydric alcohol used to synthesise the polyester polyol comprises one or more of diethylene glycol, propylene glycol, dipropylene glycol, 1,4-butane diol.

24. The composition as claimed in claim 1 comprising a surfactant for the phenolic resin and the surfactant is present in an amount of 1 to 6 parts by weight per 100 parts by weight of phenolic resin.

25. The composition as claimed in claim 24, wherein the surfactant is a castor oil-ethylene oxide adduct wherein more than 20 moles but less than 40 moles of ethylene oxide are added per 1 mole of castor oil.

26. The composition as claimed in claim 1 wherein the modifier is a compound having an amino group and said modifier is present in an amount of 1 to 10 parts by weight per 100 parts by weight of phenolic resin.

27. The composition as claimed in claim 26 wherein the compound having an amino group is selected from urea, dicyandiamide and melamine.

28. The composition as claimed in claim 27 wherein the modifier comprises approximately 5 parts by weight of urea.

29. The composition as claimed in claim 1 wherein the density of phenolic foam is from 10 to 100 kg/m$^3$.

30. The composition as claimed in claim 1 wherein the density of the phenolic foam is from 10 to 45 kg/m$^3$.

31. The composition as claimed in claim 1 wherein the phenolic foam has a closed cell content of 95.5% or more.

32. The composition as claimed in claim 1 wherein the phenolic foam has a limiting oxygen index of 30% or more.

33. The composition as claimed in claim 1 wherein the phenolic foam has a water uptake of less than 0.9 kg/m$^2$.

34. The composition as claimed in claim 1 wherein the phenolic foam has a facing on at least one surface thereof, wherein the facing comprises at least one of glass fibre-non woven fabric, spun bonded-non woven fabric, aluminium foil, bonded-non woven fabric, metal sheet, metal foil, ply wood, calcium silicate-board, plaster board, paper product, and wooden board.

\* \* \* \* \*